United States Patent

Meyerink et al.

[11] Patent Number: 6,029,961
[45] Date of Patent: Feb. 29, 2000

[54] SLEEVE-TYPE RUBBER SHOCK ABSORBER WITH HYDRAULIC DAMPING

[75] Inventors: Frank Meyerink, Lohne; Klaus Kramer, Neuenkirchen; Andreas Vossel, Osnabrück; Ernst-Günter Jördens, Damme, all of Germany

[73] Assignee: Lemförder Metallwaren AG, Stenwede-Dielingen, Germany

[21] Appl. No.: 09/030,364

[22] Filed: Feb. 25, 1998

[30] Foreign Application Priority Data

Mar. 27, 1997 [DE] Germany .................. 197 13 003

[51] Int. Cl.⁷ ........................................ F16F 13/00
[52] U.S. Cl. .................. 267/140.12; 267/140.13; 267/219
[58] Field of Search ............... 267/219, 140.12, 267/220, 140.5, 140.4, 140.11, 140.13, 141.6, 141.5, 141.4, 141.2, 35; 180/300, 312, 902; 248/562, 636, 638

[56] References Cited

U.S. PATENT DOCUMENTS

| | | | |
|---|---|---|---|
| 4,844,430 | 7/1989 | Miya et al. | 267/140.12 |
| 4,958,811 | 9/1990 | Brenner et al. | 267/140.12 |
| 5,005,810 | 4/1991 | Sawada et al. | 267/140.12 |
| 5,024,461 | 6/1991 | Miyakawa et al. | 267/140.12 |
| 5,026,031 | 6/1991 | Court | 267/140.12 |
| 5,277,410 | 1/1994 | Oshima et al. | 267/220 |
| 5,356,121 | 10/1994 | Ikeda | 267/140.12 |
| 5,595,373 | 1/1997 | Ikeda | 267/140.12 |

FOREIGN PATENT DOCUMENTS

| | | | |
|---|---|---|---|
| 442763 | 8/1991 | European Pat. Off. | 267/140.12 |
| 442764 | 8/1991 | European Pat. Off. | 267/140.12 |

*Primary Examiner*—Douglas C. Butler
*Attorney, Agent, or Firm*—McGlew and Tuttle, P.C.

[57] ABSTRACT

A sleeve-type rubber shock absorber with hydraulic damping for mounts in motor vehicles includes an inner mounting sleeve (1), an outer mounting sleeve (2) surrounding same at a radially spaced location, at least one elastomer body (3), which is adheringly arranged between the two mounting sleeves and forms at least one chamber (4) filled with hydraulic damping agent. A cap (5) sealingly closes the sleeve-type rubber shock absorber, forming a second chamber (6). A channel plate (7) is provided which contains a throttle channel (7.1) connecting the chambers (4 and 6), wherein the outer bearing sleeve (2) has at least two different external diameters, of which the mainly radially loaded area of the smaller diameter is inserted into the motor vehicle component (8). At least two stop buffers (9) are arranged distributed over the circumference and are provided on the corresponding area of the inner mounting sleeve (1). The area of the larger diameter contains the chambers (4, 6), which are separated by the channel plate (7) and are filled with damping agent. The preferably two-part channel plate (7) has a support part (7.2) with the throttle channel (7.1) as well as a cover (7.3) closing same. The support part (7.2) is made in one piece with a diaphragm (7.4), whose radially inner area is sealingly inserted into a complementary mount of the inner mounting sleeve (1).

19 Claims, 1 Drawing Sheet

SLEEVE-TYPE RUBBER SHOCK ABSORBER WITH HYDRAULIC DAMPING

FIELD OF THE INVENTION

The present invention pertains to a sleeve-type rubber shock absorber with hydraulic damping.

BACKGROUND OF THE INVENTION

Hydraulically damping mounts for reducing vibrations have been known in the automobile industry. However, the damping characteristics to be met vary, depending on the particular use. Sleeve-type rubber shock absorbers with hydraulic damping are designed for damping in the axial or radial direction. It is therefore necessary to use two separate components to buffer both directions of vibration.

SUMMARY AND OBJECTS OF THE INVENTION

The technical object of the present invention is to provide a sleeve-type rubber shock absorber with hydraulic damping, which makes it possible to damp vibrations of the vehicle occurring in both the axial direction and the radial direction.

A sleeve-type rubber shock absorber with hydraulic damping, designed as a one-part sleeve-type rubber shock absorber, is proposed for this for mounts in motor vehicles. This comprises an inner mounting sleeve, an outer sleeve surrounding this at a radially spaced location, and an elastomer body, which is arranged between the two mounting sleeves and forms at least one first chamber filled with a hydraulic damping agent. For example, rubber may be used as the material for the elastomer body or elastomer bodies of the sleeve-type rubber shock absorber. This may be used in different degrees of hardness, so that different damping characteristics can be obtained even by this. It is, of course, also possible to use plastics. Moreover, the elastomer body may be reinforced with inserts consisting of metal and/or plastic.

A channel plate, which contains a throttle channel connecting the chambers, separates the first chamber from the second chamber, which is located within a cap sealingly closing the sleeve-type rubber shock absorber. The outer mounting sleeve has at least two different external diameters, of which the area of smaller diameter, which is loaded mainly radially, is inserted into the motor vehicle component. The corresponding area of the inner mounting sleeve is provided with at least two stop buffers arranged distributed over the circumference. These assume the damping of the vibrations of the vehicle in the radial direction and are made in one piece with the elastomer body.

The area of the larger diameter contains the chambers, which are separated by the channel plate, are filled with damping agent, and are used mainly to damp the vibrations introduced into the sleeve-type rubber shock absorber in the axial direction. In the transition area between the smaller and larger diameters of the sleeve-type rubber shock absorber, the latter has a radially outwardly directed collar. This collar is also used as a stop limitation for the motor vehicle component accommodating the sleeve-type rubber shock absorber during the installation in the motor vehicle. The collar should advantageously be covered with an elastomer layer on its side facing the motor vehicle component.

The shifting of the damping chambers into the area of the larger diameter offers the advantage that a sleeve-type rubber shock absorber according to the present invention can be designed nearly as desired from a fluidic viewpoint. The area of the larger diameter is not inserted according to the present invention into a motor vehicle component, so that no geometric limits are imposed on design, which means that the external diameter is nearly freely selectable. Depending on the desired damping characteristic, it is thus also possible to expand or reduce the cross section of the throttle channel. A sleeve-type rubber shock absorber that can be designed according to the needs is thus obtained with variable volume rigidity or rigidity to bulging in relation to the diameter of the throttle channel.

Thus, it is also within the object of the present invention to provide a sleeve-type rubber shock absorber that is oversized in the area of the larger diameter and into which channel plates, which are different depending on the needs, can be inserted, and these channel plates only have identical external dimensions, but their inner structure, i.e., their throttle channel, is optimized in terms of flow for the particular case. A modular system is thus created.

An advantageous embodiment of the present invention is provided with a sleeve-type rubber shock absorber designed as a multipart, especially two-part channel plate. In this case, it has, e.g., a support part with the throttle channel as well as a cover closing same. The support part may be made in one piece with a diaphragm, whose radially inner area is sealingly inserted into a complementary mount of the inner mounting sleeve. This diaphragm damps mainly vibrations of small amplitudes.

The multipart design of the channel plate offers the advantage that air inclusions, which would affect the damping characteristic in an unintended manner, can be avoided during the installation of a sleeve-type rubber shock absorber according to the present invention. Such components are known to be mounted in a bath of the damping liquid. Thus, there would be a risk in the case of a one-part throttle channel design that air bubbles would remain in the channel and would thus be entrapped during the mounting in the sleeve-type rubber shock absorber.

In addition, it is advantageous to apply the diaphragm to the support part according to a vulcanization method. Due to the multipart design of a channel plate according to the present invention, elastomer material can be prevented from penetrating into the throttle channel during the vulcanization of the diaphragm. Manufacturing in this manner thus leads to components that meet the highest quality requirements.

The various features of the novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
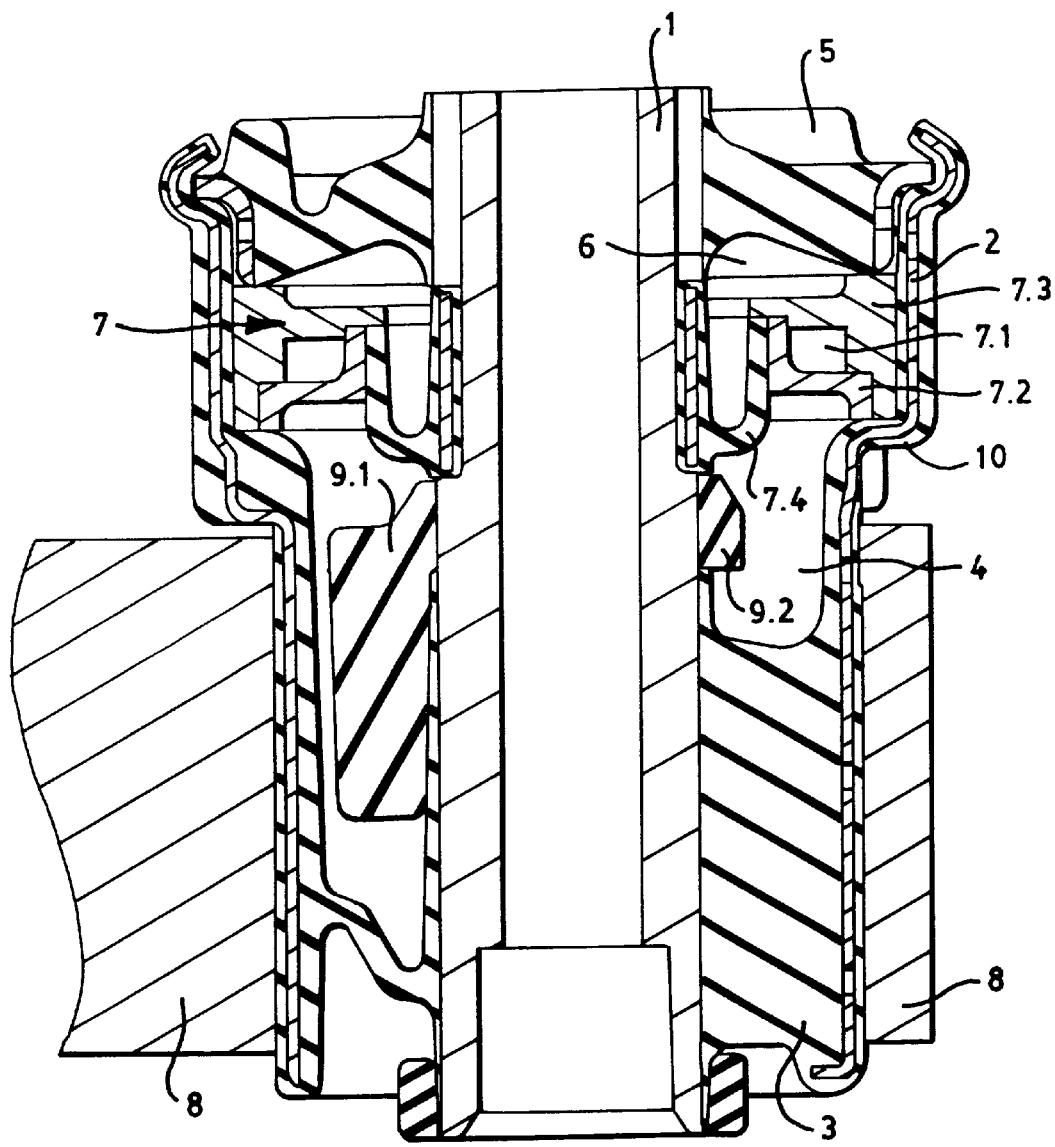
FIG. 1 is a sectional view taken through a sleeve-type rubber shock absorber according to the present invention.

FIG. 1 shows as an example a sectional view of a possible embodiment of a sleeve-type rubber shock absorber according to the present invention.

Such a sleeve-type rubber shock absorber of one-part design with hydraulic damping for mounts in motor vehicles comprises an inner mounting sleeve 1, an outer mounting sleeve 2 surrounding same at a radially spaced location, and an elastomer body 3, which is arranged between the two mounting sleeves and has a first chamber 4 filled with a hydraulic damping agent.

Rubber is used in this case as the material for the elastomer body 3 of the sleeve-type rubber shock absorber. It may be used in different degrees of hardness, so that different damping characteristics can be obtained even by this.

A channel plate 7 separates the first chamber 4 from a second chamber 6, which is located within a cap 5 sealingly closing the sleeve-type rubber shock absorber. The channel plate 7 contains a throttle channel 7.1 connecting the chambers 4 and 6.

The outer mounting sleeve 2 has two different external diameters, of which the mainly radially loaded, smaller diameter is inserted into the motor vehicle component 8. The corresponding area of the inner mounting sleeve 1 is provided with two stop buffers 9.1 and 9.2 arranged distributed over the circumference. These assume the damping of the vibrations of the vehicle in the radial direction and are made in one piece with the elastomer body 3. The area of the larger diameter contains the chambers 4, 6, which are separated by the channel plate 7, are filled with damping agent and are used mainly to damp the vibrations introduced into the sleeve-type rubber shock absorber in the axial direction.

In the transition area between the smaller and larger diameters of the sleeve-type rubber shock absorber, the latter has a radially outwardly directed collar 10. This collar is also used as a stop limitation for the motor vehicle component 8 accommodating the sleeve-type rubber shock absorber during the installation in the motor vehicle. The outer sleeve 2 is covered with an elastomer layer, especially the collar 10, on its side facing the motor vehicle component 8.

The channel plate 7 of a sleeve-type rubber shock absorber according to the present invention is designed as a two-part channel plate. It has a support part 7.2 with the throttle channel 7.1 as well as a cover 7.3 closing same. The support part 7.2 is made in one piece with a diaphragm 7.4, whose radially inner area is sealingly inserted into a complementary mount of the inner mounting sleeve 1. The diaphragm 7.4 damps mainly vibrations of small amplitudes. The diaphragm 7.4 and the support part 7.2 are nondetachably connected by a vulcanization process.

While a specific embodiment of the invention has been shown and described in detail to illustrate the application of the principles of the invention, it will be understood that the invention may be embodied otherwise without departing from such principles.

What is claimed is:

1. A sleeve-type rubber shock absorber with hydraulic damping for mounts in motor vehicles, comprising:

an inner mounting sleeve;

an outer mounting sleeve surrounding said inner mounting sleeve at a radially spaced location;

at least one elastomer body arranged between said inner mounting sleeve and said outer mounting sleeve, and adhered said inner mounting sleeve and said outer mounting sleeve;

a cap formed of elastic material and sealingly closing an end of the sleeve-type rubber shock absorber;

a channel plate disposed between said cap and said elastomer body, said channel plate cooperating with said elastomer body to form at least one chamber filled with hydraulic damping agent, said cap and said channel plate cooperating to form a second chamber, said channel plate including a throttle channel connecting said at least one chamber and said second chamber, said channel plate being connected to said inner sleeve, said outer mounting sleeve having at least two different external diameters including a mainly radially loaded area of a smaller diameter which is inserted into a motor vehicle component and an area of larger diameter;

at least two stop buffers arranged distributed over a circumference of said inner mounting sleeve adjacent to said area of a smaller diameter, said area of larger diameter contains said at least one chamber and said second chamber which are separated by said channel plate and are filled with damping agent.

2. The sleeve-type rubber shock absorber with hydraulic damping in accordance with claim 1, wherein said channel plate is a two-part channel plate with a support part with said throttle channel as well as a cover closing said throttle channel, said support part being made in one piece with a diaphragm having a radially inner area sealingly inserted into a complementary mount of said inner mounting sleeve.

3. The absorber in accordance with claim 2, wherein:

said channel plate includes a rubber diaphragm vulcanized to said support part, said diaphragm having an arc shape for damping vibrations of small amplitude.

4. The absorber in accordance with claim 1, wherein:

said two stop buffers are made in one piece with said elastomer body.

5. The absorber in accordance with claim 1, wherein:

said elastomer body substantially exclusively damps vibrations in a radial direction of said sleeves.

6. The absorber in accordance with claim 1, wherein:

said channel plate includes means for assembling said support part and said cover part after said support part is inserted into said first chamber and filled with said hydraulic damping agent to prevent entrapment of air bubbles in said throttle channel.

7. The absorber in accordance with claim 1, wherein:

said area of said larger diameter forms a stop limitation for said area of said smaller diameter being inserted into the motor vehicle component.

8. The absorber in accordance with claim 1, wherein:

an elastomer layer is positioned on an outside of said outer mounting sleeve.

9. The absorber in accordance with claim 8, wherein:

a collar is provided between said area of said smaller diameter and said area of said larger diameter;

said elastomer layer is positioned on an outside of said area of said smaller diameter and on said collar, said elastomer layer being between said outer mounting sleeve and the motor vehicle component.

10. A sleeve-type rubber shock absorber with hydraulic damping for connecting components of a motor vehicle, the absorber comprising:

an inner mounting sleeve having means for connecting to a first component of the motor vehicle;

an outer mounting sleeve surrounding said inner mounting sleeve at a radially spaced location, said mounting sleeve having at least two different external diameters including a mainly radially loaded area of a smaller diameter which is inserted into a second component of the motor vehicle and an area of larger diameter outside of said second component;

an elastomer body arranged between said inner mounting sleeve and said outer mounting sleeve, and adhered with said inner mounting sleeve and said outer mounting sleeve, said elastomer body including two stop buffers arranged distributed over a circumference of said inner mounting sleeve adjacent to said area of said smaller diameter;

a cap formed of elastic material and sealingly closing an end of the sleeve-type rubber shock absorber;

a channel plate disposed between said cap and said elastomer body, said channel plate cooperating with said elastomer body to form a first chamber, said cap and said channel plate cooperating to form a second chamber, said channel plate including a throttle channel connecting said first chamber and said second chamber, said area of said larger diameter includes said first chamber and said second chamber which are separated by said channel plate and are filled with damping agent, said channel plate being connected to said inner sleeve.

11. The absorber in accordance with claim 10, wherein:

said inner mounting sleeve defines a mounting area;

said channel plate includes a support part and cover part, said cover part having a radially inner area sealingly inserted into said mounting area of said inner sleeve.

12. The absorber in accordance with claim 11, wherein:

said channel plate includes a rubber diaphragm vulcanized to said support part, said diaphragm having an arc shape for damping vibrations of small amplitude.

13. The absorber in accordance with claim 10, wherein:

said two stop buffers are made in one piece with said elastomer body.

14. The absorber in accordance with claim 10, wherein:

said elastomer body substantially exclusively damps vibrations in a radial direction of said sleeves.

15. The absorber in accordance with claim 10, wherein:

said channel plate includes means for assembling said support part and said cover part after said support part is inserted into said first chamber and filled with said hydraulic damping agent to prevent entrapment of air bubbles in said throttle channel.

16. The absorber in accordance with claim 10, wherein:

said area of said larger diameter forms a stop limitation for said area of said smaller diameter being inserted into the first component.

17. The absorber in accordance with claim 10, wherein:

an elastomer layer is positioned on an outside of said outer mounting sleeve.

18. The absorber in accordance with claim 17, wherein:

a collar is provided between said area of said smaller diameter and said area of said larger diameter;

said elastomer layer is positioned on an outside of said area of said smaller diameter and on said collar, said elastomer layer being between said outer mounting sleeve and the second component.

19. The absorber in accordance with claim 10, wherein:

said inner sleeve extends through said channel plate and said cap.

* * * * *